US009641883B2

(12) United States Patent
Khare (10) Patent No.: US 9,641,883 B2
(45) Date of Patent: May 2, 2017

(54) SYSTEM AND METHOD FOR PROVIDING INTEGRATED ADVERTISING IN A TELEVISION DISTRIBUTION NETWORK (71) Applicant: SUREWAVES MEDIATECH PRIVATE LIMITED, Bangalore (IN)

(72) Inventor: Rajendra Kumar Khare, Bangalore (IN)

(73) Assignee: SUREWAVES MEDIATECH PRIVATE LIMITED, Karnataka (IN)

(*) Notice: Subject to any disclaimer, the term of this patent is extended or adjusted under 35 U.S.C. 154(b) by 0 days.

(21) Appl. No.: 14/631,863

(22) Filed: Feb. 26, 2015

(65) Prior Publication Data

US 2015/0249847 A1 Sep. 3, 2015

(30) Foreign Application Priority Data

Feb. 28, 2014 (IN) .............................. 352/CHE/2014

(51) Int. Cl.
H04N 7/025 (2006.01)
H04N 21/2668 (2011.01)
H04N 21/81 (2011.01)
H04N 21/234 (2011.01)
H04N 21/236 (2011.01)

(52) U.S. Cl.
CPC ... *H04N 21/2668* (2013.01); *H04N 21/23418* (2013.01); *H04N 21/23614* (2013.01); *H04N 21/812* (2013.01); *H04N 21/8153* (2013.01)

(58) Field of Classification Search
CPC .................. H04N 21/812; H04N 21/4532
USPC ............................................. 725/34, 32, 116
See application file for complete search history.

(56) References Cited

U.S. PATENT DOCUMENTS

2004/0194128 A1* 9/2004 McIntyre ............... H04N 5/272
725/32

* cited by examiner

Primary Examiner — Jivka Rabovianski
(74) Attorney, Agent, or Firm — Barry Choobin; Patent 360 LLC (57) ABSTRACT A system and method for providing integrated advertising in a television distribution network is disclosed. The system comprises a storage module, a processor in communication with the storage module and a chroma-keying module. The storage module stores one television program and one image to be integrated with the television program. The processor divides a background of the television program into a plurality of frames. The processor identifies the background color of each spatial frame. The chroma-keying module compares the background color of each frame with a pre-selected chroma range for integrating the image into detected frame, when the background color of the frame matches with one key-color in the pre-selected chroma range. The spatial frame is replaced with a preset advertisement based on the type, genre and time of the telecast program on a plurality of channels.

11 Claims, 2 Drawing Sheets

SYSTEM AND METHOD FOR PROVIDING INTEGRATED ADVERTISING IN A TELEVISION DISTRIBUTION NETWORK

CROSS REFERENCE TO RELATED APPLICATION

The embodiments herein claims the priority of the Indian Provisional Patent Application (PPA) with serial number 352/CHE/2014 filed on Jan. 28, 2014 with the title, "Method and System for Chroma-Keying Based Advertising in Cable or Satellite Television" and subsequently post-dated to Feb. 28, 2014 and the contents of which are incorporated in entirety as reference herein.

BACKGROUND

Technical Field

The embodiments herein generally relates to field of advertising and particularly relates to the field of advertising for television. The embodiments herein more particularly relates to a method and system for providing integrated advertisements in a television program.

Description of the Related Art

Presenting advertisements to consumers has long been the subject of research, especially on how to best provide an appropriate advertising to the relevant consumer market.

Various methodologies are proposed for providing advertisements to consumers and one of the recent innovation is relating to integrated advertising technique. In integrated advertising, various graphical or captured images such as scoreboards, games statistics, advertisements, logos, and play-by-play graphics are included in the television program. For example, the broadcast of a cricket game may include one or more empty spots in which an advertisement is displayed. The television program with the integrated advertisements is then broadcasted to the television viewers. The insertion of the images is typically performed at the local broadcasting station and, typically, the images to be inserted are advertisements for local products.

Chroma-keying is a technique used in film, video and still photography to replace a portion of an image with a new image. This is most commonly used to replace a coloured background with a different setting. The most common colours used in chroma-keying are blue and green, because these colours are least likely to affect the foreground shot. Blue screen and green screen sets are very common in film and television studios. The use of green screen and blue screen is a popular technique for both video and film special effects. Chroma keying is usually adopted in post-production or in real-time scenarios. The television programs such as news and entertainment programs frequently use the chroma-technique for editing a surrounding in the programs.

In view of the foregoing, there is a need for a method and system which uses the chroma-keying technique for providing in-place integrated advertising in a cable or satellite television system. There is further need for a method and system which dynamically changes a background of the television programs such as news and entertainment shows without affecting a foreground of the television program. Still there is a need to develop a system and method to identify a spatial marker frame in a plurality of channels to replace the spatial frame with a preset advertisement based on a type, genre and the time of telecast program in each channel at a single stroke or with a single operation.

The abovementioned shortcomings, disadvantages and problems are addressed herein and which will be understood by reading and studying the following specification.

OBJECTIVES OF THE EMBODIMENTS

The primary object of the embodiments herein is to provide a method and system for providing in-place integrated advertising in a television program using a chroma-keying technique.

Another object of the embodiments herein is to provide a method and system for adopting chroma-keying based in-place integrated advertisements across multiple channels on the fly.

Yet another object of the embodiments herein is to provide a method and system for which dynamically changing a background of the television programs such as news and entertainment shows without affecting a foreground of the television program.

Yet another object of the embodiments herein is to provide a real time integration of the advertisement in the television program before broadcasting the program on a television network.

Yet another object of the embodiments herein is to develop a system and method to identify a spatial marker frame in a plurality of channels to replace the spatial frame with a preset advertisement based on a type, genre and the time of telecast program in each channel at a single stroke or with a single operation.

Yet another object of the embodiments herein is to develop a system and method to enable the broadcaster or the channel owner or the studio owner to insert the spatial marker at any desired place on the telecast programme based on the time and the genre.

These and other objects and advantages of the embodiments herein will become readily apparent from the following detailed description taken in conjunction with the accompanying drawings.

SUMMARY

The various embodiments herein provide a system and method for providing integrated advertising in a television distribution network. The system comprises a storage module, a processor in communication with the storage module and a chroma-keying module. The system comprises a background scheduling module configured to schedule at least one image which is to be integrated into at least one television program to be played on a display terminal. The storage module is configured to store the television program and the image required to be integrated with the television program. The processor is configured to divide a background of the television program into a plurality of frames. The processor is further configured to identify the background colour of each of the frames. The chroma-keying module is configured to compare the background colour of each of the frames with a pre-selected chroma range. The chroma-keying module is further configured to integrate the image into at least one frame, only in the event that the background colour of the frame matches at least one key-colour from the pre-selected chroma range.

According to one embodiment herein, the image is one of an advertisement, a scoreboard a trailer, a promotion banner and a logo.

According to one embodiment herein, the pre-selected chroma range comprises a plurality of specific key-colours of single hue.

According to one embodiment herein, the plurality of frames are divided into same dimension or different dimensions. The plurality of frames are created based on the type of television program.

According to one embodiment herein, a broadcaster is facilitated to place at least one spatial marker in the background of the television program, wherein the spatial marker is composed of a frame of a preset size and preset colour selected from the chroma range.

According to one embodiment herein, a channel operator is facilitated to select the image or advertisement which replaces the spatial mark in the television program.

According to one embodiment herein, the background scheduling module provides centralized scheduling of a plurality of images or advertisements that are to be integrated with the television program at different time slots.

According to an one embodiment herein, the background scheduling module is configured to identify a type of the television program which has to incorporate the image.

According to one embodiment herein, the background scheduling module selects the image depending on a size and a color frame of the spatial matrix incorporated in the background of the television program.

According to one embodiment herein, the background scheduling module accordingly schedules the selected image which replaces the spatial matrix, depending on a genre, a time period and the type of the television program.

According to one embodiment herein, the system comprises a library configured to store the image along with a scheduling data generated by the background scheduling module According to one embodiment herein, the chroma-keying unit is configured to check the background of the television program for presence of the spatial marker, wherein the chroma-keying unit is configured to replace the spatial marker with the selected image.

According to one embodiment herein, the broadcaster or the channel owner is provided with a choice of providing the spatial marker at any desired place on the telecast programme based on the time and the genre.

According to one embodiment herein, the head end module is a studio module.

According to one embodiment herein, the system and method enables to replace a spatial marker with a preset advertisement over a plurality of channels at one go based on the time and genre of the programme in the plurality of channels.

According to one embodiment herein, a library stored with a plurality of advertisements for replacing a spatial marker on a plurality of channels based on the genre and time of each individual channel. The spatial marker in individual channel is replaced with a respective or preset add based on the time and genre of the program being telecast tin the channel.

According to one embodiment herein, the scheduler or the scheduling unit is configured to identify a type of program and a spatial frame of predetermined size in the background area of the telecast program, to replace the spatial frame with a preset advertisement based on the genre and the type of the program and the telecast time.

According to one embodiment herein, the chroma keying unit is configured to check and identify the pre-set advertisement to be played in the area of spatial marker frame provided in the background of the telecast program in a channel. The chroma keying unit is further configured to check whether the preset advertisement to be played is received already from the scheduling unit.

According to one embodiment herein, the channel owner or the studio owner is provided with a choice of inserting a spatial frame of desired size at any desired place in the telecast program. The size of spatial frame is defined by the number of pixels in the spatial frame.

According to one embodiment herein, the system further comprises a communication module configured to transmit the television program integrated with the image to a set-top box. The communicating module modulates and transmits the television program integrated with the image on a channel frequency.

According to one embodiment herein, a set-top box is in communication with the communication module. The set-top box is configured to tune to the channel frequency so as to receive the television program integrated with the image. The set top box is configured to display the television program on a display device.

According to one embodiment herein, the system creates a proof of play archive comprising the television program integrated with the image along with a time stamp. The proof of play archive is used for accountability purpose.

The various embodiments herein provide a method for providing an integrated advertising in a television distribution network using a chroma-keying technique. The method comprising steps of: scheduling at least one image which is to be integrated into at least one television program to be played on a display terminal; storing a television program and an image required to be integrated with the television program; dividing a background of the television program into a plurality of frames; identifying the background colour for each of the frames; comparing the background colour for each of the frames with a key colour from a pre-selected chroma range; integrating the image into at least one frame, when the background colour of the frame matches with at least one key-colour from the pre-selected chroma range; transmitting the integrated television program to a set-top box using a channel frequency; tuning the set top box to the respective channel frequency to receive the integrated television program; and displaying the integrated television program on the display terminal.

According to one embodiment herein, the method further comprises step of placing at least one spatial marker in the background of the television program to incorporate the image in the location of the spatial marker;

According to one embodiment herein, the method further comprises steps of: checking the background of the television program for presence of the spatial marker; and replacing the spatial marker with the selected image.

According to one embodiment herein, the method further comprise a step of reporting a proof of play archive comprising the television program integrated with the image along with a time stamp for accountability purpose.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE INVENTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system and method for providing integrated advertising in a television distribution network. The system comprises a storage module, a processor in communication with the storage module and a chroma-keying module. The system comprises a background scheduling module configured to schedule at least one image which is to be integrated into at least one television program to be played on a display terminal. The storage module is configured to store the television program and the image required to be integrated with the television program. The processor is configured to divide a background of the television program into a plurality of frames. The processor is further configured to identify the background colour of each of the frames. The chroma-keying module is configured to compare the background colour of each of the frames with a pre-selected chroma range. The chroma-keying module is further configured to integrate the image into at least one frame, only in the event that the background colour of the frame matches at least one key-colour from the pre-selected chroma range.

According to one embodiment herein, the image is one of an advertisement, a scoreboard a trailer, a promotion banner and a logo.

According to one embodiment herein, the pre-selected chroma range comprises a plurality of specific key-colours of single hue.

According to one embodiment herein, the plurality of frames are divided into same dimension or different dimensions. The plurality of frames are created based on the type of television program.

According to one embodiment herein, a broadcaster is facilitated to place at least one spatial marker in the background of the television program, wherein the spatial marker is composed of a frame of a preset size and preset colour selected from the chroma range.

According to one embodiment herein, a channel operator is facilitated to select the image or advertisement which replaces the spatial mark in the television program.

According to one embodiment herein, the background scheduling module provides centralized scheduling of a plurality of images or advertisements that are to be integrated with the television program at different time slots.

According to one embodiment herein, the background scheduling module is configured to identify a type of the television program which has to incorporate the image.

According to one embodiment herein, the background scheduling module selects the image depending on a size and a color frame of the spatial matrix incorporated in the background of the television program.

According to one embodiment herein, the background scheduling module accordingly schedules the selected image which replaces the spatial matrix, depending on a genre, a time period and the type of the television program.

According to one embodiment herein, the system comprises a library configured to store the image along with a scheduling data generated by the background scheduling module According to one embodiment herein, the chroma-keying unit is configured to check the background of the television program for presence of the spatial marker, wherein the chroma-keying unit is configured to replace the spatial marker with the selected image.

According to one embodiment herein, the broadcaster or the channel owner is provided with a choice of providing the spatial marker at any desired place on the telecast programme based on the time and the genre.

According to one embodiment herein, the head end module is a studio module.

According to one embodiment herein, the system and method enables to replace a spatial marker with a preset advertisement over a plurality of channels at one go based on the time and genre of the programme in the plurality of channels.

According to one embodiment herein, a library stored with a plurality of advertisements for replacing a spatial marker on a plurality of channels based on the genre and time of each individual channel. The spatial marker in individual channel is replaced with a respective or preset add based on the time and genre of the program being telecast tin the channel.

According to one embodiment herein, the scheduler or the scheduling unit is configured to identify a type of program and a spatial frame of predetermined size in the background area of the telecast program, to replace the spatial frame with a preset advertisement based on the genre and the type of the program and the telecast time.

According to one embodiment herein, the chroma keying unit is configured to check and identify the pre-set advertisement to be played in the area of spatial marker frame provided in the background of the telecast program in a channel. The chroma keying unit is further configured to check whether the preset advertisement to be played is received already from the scheduling unit.

According to one embodiment herein, the channel owner or the studio owner is provided with a choice of inserting a spatial frame of desired size at any desired place in the telecast program. The size of spatial frame is defined by the number of pixels in the spatial frame.

According to one embodiment herein, the system further comprises a communication module configured to transmit the television program integrated with the image to a set-top box. The communicating module modulates and transmits the television program integrated with the image on a channel frequency.

According to one embodiment herein, a set-top box is in communication with the communication module. The set-top box is configured to tune to the channel frequency so as to receive the television program integrated with the image. The set top box is configured to display the television program on a display device.

According to one embodiment herein, the system creates a proof of play archive comprising the television program integrated with the image along with a time stamp. The proof of play archive is used for accountability purpose.

The various embodiments herein provide a method for providing an integrated advertising in a television distribution network using a chroma-keying technique. The method comprising steps of: scheduling at least one image which is to be integrated into at least one television program to be played on a display terminal; storing a television program and an image required to be integrated with the television program; dividing a background of the television program into a plurality of frames; identifying the background colour for each of the frames; comparing the background colour for each of the frames with a key colour from a pre-selected chroma range; integrating the image into at least one frame, when the background colour of the frame matches with at least one key-colour from the pre-selected chroma range; transmitting the integrated television program to a set-top box using a channel frequency; tuning the set top box to the respective channel frequency to receive the integrated television program; and displaying the integrated television program on the display terminal.

According to one embodiment herein, the method further comprises step of placing at least one spatial marker in the background of the television program to incorporate the image in the location of the spatial marker;

According to one embodiment herein, the method further comprises steps of: checking the background of the television program for presence of the spatial marker; and replacing the spatial marker with the selected image.

According to one embodiment herein, the method further comprise a step of reporting a proof of play archive comprising the television program integrated with the image along with a time stamp for accountability purpose.

The various embodiments herein provide a system for chroma-keying based in-place integrated advertising in a plurality of television programs. The system is configured to integrate the advertisements in form of images and/or videos with the television program using a chroma-keying technique. The images and/or videos can be relating to advertisements, logos, scoreboards, trailers, promotional banners and the like. The television program is a video stream relating to news, live events, sports, stage shows, daily series and the like. Multiple images and/or videos corresponding to the television program are integrated simultaneously. The images and/or videos can also be are configured to be played in a random sequence, wherein the images and/or videos displayed in the background of the television program changes after a pre-defined time period. The television program comprises a foreground scene filmed against a background scene. The background scene of the television is of a single monochromatic colour or else the background is framed of multiple monochromatic colours. The images and/or videos are configured to be integrated in the background of the television program, whereas the foreground scene is retained and displayed with the integrated television program.

The system adopts chroma-keying technique by performing a numerical comparison between the background of the television program and a chroma key colour. When the colour at a particular point on the background of the television program matches (either exactly, or in a range) with the chroma key-colour, the system replaces the respective background by an alternate background such as advertisement, scoreboard, trailer, logo and the like, without affecting content of the actual television program. The background with a single monochromatic colour is entirely replaced with the image and/or video. For example a weather forecast program is being filmed, with a weather reporter appears in front of a blue background. The system replaces the entire blue background of the weather forecast program with a single image comprising the weather information, advertisements, channel logo, and the like. The television program having multiple monochromatic backgrounds is configured to include multiple images and/or videos. For example, a sports event program comprises two monochromatic background, one being a blue background and other being a green background. The system is configured to replace the blue background with a scoreboard image and the green background is overlaid with an advertisement image.

According to one embodiment herein, a broadcaster is facilitated to place at least one spatial marker in the background of the television program, wherein the spatial marker is composed of a frame of a preset size and preset colour selected from the chroma range.

According to one embodiment herein, a channel operator is facilitated to select the image or advertisement which replaces the spatial mark in the television program.

According to one embodiment herein, the background scheduling module provides centralized scheduling of a plurality of images or advertisements that are to be integrated with the television program at different time slots.

According to one embodiment herein, the background scheduling module is configured to identify a type of the television program which has to incorporate the image.

According to one embodiment herein, the background scheduling module selects the image depending on a size and a color frame of the spatial matrix incorporated in the background of the television program.

According to one embodiment herein, the background scheduling module accordingly schedules the selected image which replaces the spatial matrix, depending on a genre, a time period and the type of the television program.

According to one embodiment herein, the system comprises a library configured to store the image along with a scheduling data generated by the background scheduling module According to one embodiment herein, the chroma-keying unit is configured to check the background of the television program for presence of the spatial marker, wherein the chroma-keying unit is configured to replace the spatial marker with the selected image.

According to one embodiment herein, the broadcaster or the channel owner is provided with a choice of providing the spatial marker at any desired place on the telecast programme based on the time and the genre.

According to one embodiment herein, the head end module is a studio module.

According to one embodiment herein, the system and method enables to replace a spatial marker with a preset advertisement over a plurality of channels at one go based on the time and genre of the programme in the plurality of channels.

According to one embodiment herein, a library stored with a plurality of advertisements for replacing a spatial marker on a plurality of channels based on the genre and time of each individual channel. The spatial marker in individual channel is replaced with a respective or preset add based on the time and genre of the program being telecast tin the channel.

According to one embodiment herein, the scheduler or the scheduling unit is configured to identify a type of program and a spatial frame of predetermined size in the background area of the telecast program, to replace the spatial frame with a preset advertisement based on the genre and the type of the program and the telecast time.

According to one embodiment herein, the chroma keying unit is configured to check and identify the pre-set advertisement to be played in the area of spatial marker frame provided in the background of the telecast program in a channel. The chroma keying unit is further configured to check whether the preset advertisement to be played is received already from the scheduling unit.

According to one embodiment herein, the channel owner or the studio owner is provided with a choice of inserting a spatial frame of desired size at any desired place in the telecast program. The size of spatial frame is defined by the number of pixels in the spatial frame.

Figure 1:
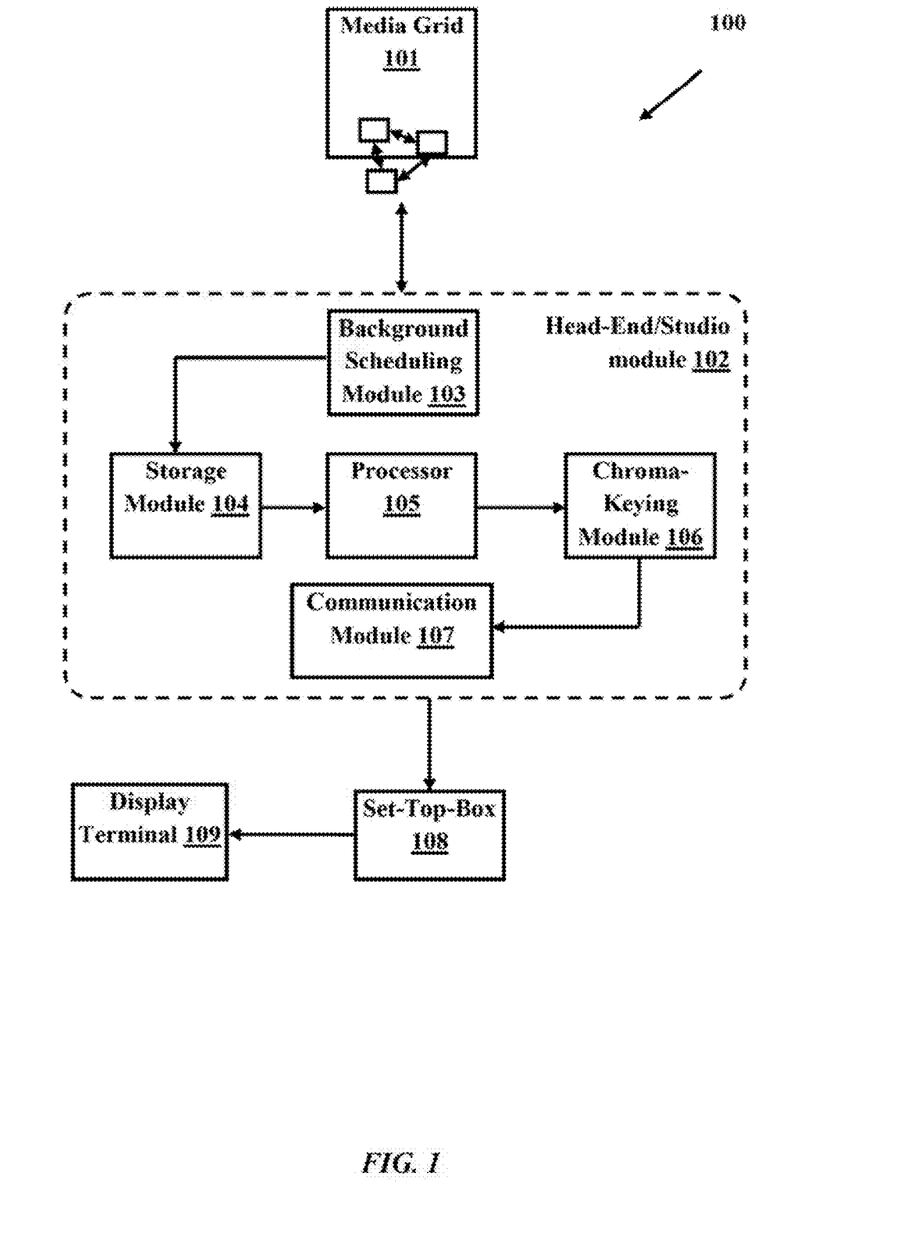
FIG. 1 illustrates a block diagram of a system providing integrated advertising in a television distribution system, according to one embodiment herein.

FIG. 1 illustrates a block diagram of a system providing integrated advertising in use with a digital television system, according to one embodiment herein. Referring to FIG. 1, the digital television system 100 comprises a media grid 101, a head-end/studio module 102, a set top box 108, a display terminal 109. The media grid 101 is hosted on a cloud and is configured to connect a plurality of television broadcasters and a plurality of advertisers. The advertisers are allowed to choose at least one television program broadcasted by a particular broadcaster on which the advertisements are to be played. The broadcaster is facilitated to place at least one spatial marker in a background of the television program. The spatial marker is composed of a particular key-colour selected from a pre-selected chroma range. The system is configured to replace the spatial marker with the advertisements. A channel operator is facilitated to select the advertisements which replaces the spatial mark in the television program. An internet connectivity is provided for enabling communication between the head-end/studio module 102 and the media grid 101.

The system providing integrated advertising is incorporated into the head-end/studio module 102 of the television system 100. The system comprises a background scheduling module 103 configured to schedule the advertisements which is to be integrated into the television program. The background scheduling module 103 is further configured to provide a centralized scheduling for a plurality of time slots for which the advertisements are to be played in the television program. The advertisements are scheduled according to the television program, for example company A might want to advertise on a quiz book then the background scheduling module 103 schedules the advertisement to be played during a quiz show. Suppose company B might want to advertise on an eatery, then the advertisement is scheduled to be displayed during a cookery show or a travel show. The background scheduling module 103 further selects the advertisements depending on a size and a color frame of the spatial matrix incorporated in the background of the television program. The background scheduling module 103 accordingly schedules the selected advertisement which replaces the spatial matrix, depending on a genre, a time period and the type of the television program. The background scheduling module 103 communicates the scheduling data relating to the television programs and the associating advertisements to the storage module 104.

The system 100 for integrating advertisements further comprises a storage module 104, a processor 105 and a chroma-keying unit 106. The system is configured to integrate the advertisements in form of images and/or videos with the television program using a chroma-keying technique. The storage module 104 receives and stores the television programs and the associating advertisement images and/or videos along with the scheduling data. The module comprises a library configured to storing the advertisement images along with the scheduling data generated by the background scheduling module. The television programs stored in the storage module are provided to the processor. The processor 105 is configured to divide the background of the television program into a plurality of frames. The frames are formed depending on the type of television program being aired. The size for multiple frames can be of single dimension or the dimensions of the frames vary according to the images and/or videos being incorporated in the television program. For example, a top left corner frame is of dimension 2×2 pre-determined pixel size, top right corner is frame 3×5 pre-determined pixel size, and the like. The frames are also divided considering the multiple monochromatic colours used in the background of the television. The frames can be provided with a single or different colours and the complete background excluding plurality of frames is provided with a single colour different from the colours provided for plurality of frames. For example, if top left corner frame is provided with a blue colour and the top right corner frame is provided with green colour then the background excluding the blue frame and the green frame is provided with a different colour, for example, red colour. The processor 105 is further configured to identify the colour of each of the frames. The processor 105 calculates an amount and frequency of the colours contained within each of the frames.

The information pertaining to the plurality of frames are forwarded to the chroma-keying unit 106. The information comprises background data comprising details on the colour of the frames, number of frames within a television window, dimension of each frame, and the like. The chroma-keying unit 106 receives the television program with the framed background as a first input and the images and/or videos relating to the advertisements, scoreboards, logos and the like as a second input. The chroma-keying unit 106 is loaded with the pre-selected chroma-range comprising values for the plurality of specific key-colours. The key colours are specific colours, such as blue and green, which are typically used in chroma-keying for representing the background of television program. The key colours are of uniform and distinct values having single bright hue. The chroma-keying unit is configured to identify the location of the spatial marker in the display frame of the television program. The chroma-keying unit 106 is configured to replace the frames within the spatial marker of the television program with the image and/or video by using chroma-keying technique. The chroma-keying unit 106 compares the colour values for each of the frames of the television program with each of the key colour listed in the pre-selected chroma range. The frames, whose colour value matches with one of the key colour, are recognised to comprise the spatial marker and hence the frames are replaced with the image/video. The frames of the same background with different spatial markers are replaced with different images/videos. For example, in a sports program, the spatial marker having blue colour is replaced with an advertisement image, whereas the spatial marker of green colour is replace with a scoreboard. The chroma-keying unit 106 blends the image and/or video behind the foreground of the television program to create a single finalised television program which is ready for broadcasting.

The chroma-keying unit 106 provides the final integrated television program to a communication module 107 of the head-end/studio module 102 for transmitting the program to a user end. The communication module 107 is configured to modulate the television program on a channel frequency. The communication module 107 further combines the modulated television program with a plurality of other television channels and inserts into a single communication means. The television channels are communicated through a wired means such as optical cables, RF cables and the like or through a wireless means such as Wi-Fi (802.11), Radio Frequency (RF), Bluetooth, Infrared, WLAN, cellular, satellite, microwave, ultra-wideband, and the like. The plurality of television channels with different frequencies are transmitted through the single communication means to the set-top-box 108.

The set-top box 108 is configured to receive the television program integrated with the advertisement image and/or video, when the set-top box 108 is tuned to the respective channel frequency on which the program is transmitted. The received television program is de-modulated and processed so as to be displayed on the display terminal 109 such as television, computer, desktop, laptop and the like.

According to one embodiment herein, the system reports a proof for television programs integrated with the image and/or video which are being played at respective timing in respective channels. The proof is typically used for accountability purpose. The system creates a proof of play archive comprising an actual television content/program integrated with the image and/or video being played in the respective channel along with a time stamp. The system transmits the proof of play archive to the media grid 101, so that the archive is available to the advertisers and the broadcasters on the media grid 101.

According to one embodiment herein, a broadcaster is facilitated to place at least one spatial marker in the background of the television program, wherein the spatial marker is composed of a frame of a preset size and preset colour selected from the chroma range.

According to one embodiment herein, a channel operator is facilitated to select the image or advertisement which replaces the spatial mark in the television program.

According to one embodiment herein, the background scheduling module provides centralized scheduling of a plurality of images or advertisements that are to be integrated with the television program at different time slots.

According to one embodiment herein, the background scheduling module is configured to identify a type of the television program which has to incorporate the image.

According to one embodiment herein, the background scheduling module selects the image depending on a size and a color frame of the spatial matrix incorporated in the background of the television program.

According to one embodiment herein, the background scheduling module accordingly schedules the selected image which replaces the spatial matrix, depending on a genre, a time period and the type of the television program.

According to one embodiment herein, the system comprises a library configured to store the image along with a scheduling data generated by the background scheduling module According to one embodiment herein, the chroma-keying unit is configured to check the background of the television program for presence of the spatial marker, wherein the chroma-keying unit is configured to replace the spatial marker with the selected image.

According to one embodiment herein, the broadcaster or the channel owner is provided with a choice of providing the spatial marker at any desired place on the telecast programme based on the time and the genre.

According to one embodiment herein, the head end module is a studio module.

According to one embodiment herein, the system and method enables to replace a spatial marker with a preset advertisement over a plurality of channels at one go based on the time and genre of the programme in the plurality of channels.

According to one embodiment herein, a library stored with a plurality of advertisements for replacing a spatial marker on a plurality of channels based on the genre and time of each individual channel. The spatial marker in individual channel is replaced with a respective or preset add based on the time and genre of the program being telecast tin the channel.

According to one embodiment herein, the scheduler or the scheduling unit is configured to identify a type of program and a spatial frame of predetermined size in the background area of the telecast program, to replace the spatial frame with a preset advertisement based on the genre and the type of the program and the telecast time.

According to one embodiment herein, the chroma keying unit is configured to check and identify the pre-set advertisement to be played in the area of spatial marker frame provided in the background of the telecast program in a channel. The chroma keying unit is further configured to check whether the preset advertisement to be played is received already from the scheduling unit.

According to one embodiment herein, the channel owner or the studio owner is provided with a choice of inserting a spatial frame of desired size at any desired place in the telecast program. The size of spatial frame is defined by the number of pixels in the spatial frame.

Figure 2:
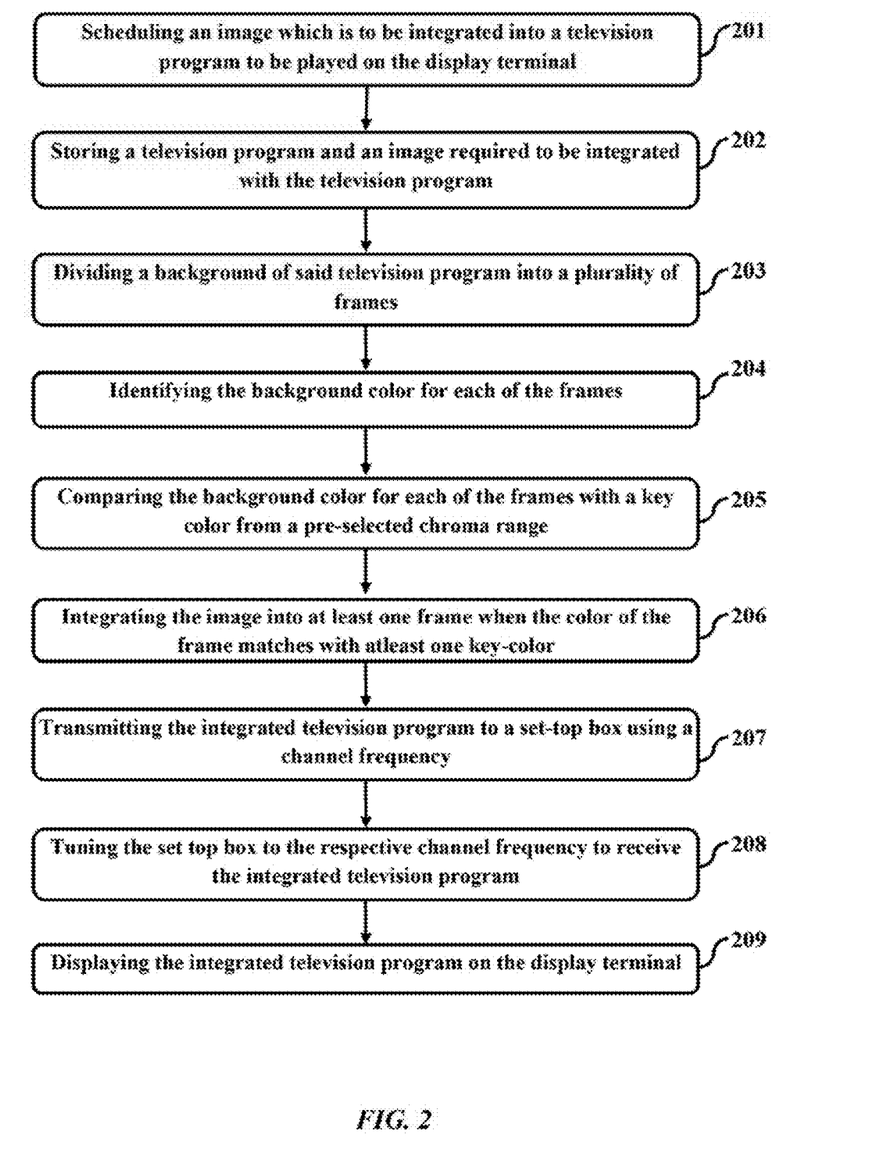
FIG. 2 is a flowchart illustrating a method for providing integrated advertising in a television distribution system, according to one embodiment herein.

FIG. 2 is a flowchart illustrating a method for providing integrated advertising in a television distribution system, according to one embodiment herein. The method, with respect to FIG. 2, comprises steps of scheduling at least one image which is to be integrated into at least one television program to be played on the display terminal (201). The television program and the image and/or video along with the scheduling data is stored (202). The background of the television program is divided into the plurality of frames of similar or different dimensions (203). The background colour for each frame of the television program is identified and analysed to estimate the amount and frequency of the colour (204). The background colour of each of the frames is compared with the plurality of key-colours included in the pre-selected chroma range in order to identify the spatial marker in the background of the television program (205). On comparison, if the background colour of one or more frame matches with at least one key-color from the pre-selected chroma range, the frames of the television program are identified to comprise spatial marker and the frames are replaced with the image and/or video containing at least an advertisement, a scoreboard, a logo, a promotional banner, a trailer and the like (206). The television program integrated with an alternate background is transmitted to the set-top box, by modulating the program on a particular channel frequency (207). The set top box is tuned to the respective channel frequency so as to receive the integrated television program (208). The received program further processed and transmitted to be displayed on the display terminal (209).

According to one embodiment herein, a broadcaster is facilitated to place at least one spatial marker in the background of the television program, wherein the spatial marker is composed of a frame of a preset size and preset colour selected from the chroma range.

According to one embodiment herein, a channel operator is facilitated to select the image or advertisement which replaces the spatial mark in the television program.

According to one embodiment herein, the background scheduling module provides centralized scheduling of a plurality of images or advertisements that are to be integrated with the television program at different time slots.

According to one embodiment herein, the background scheduling module is configured to identify a type of the television program which has to incorporate the image.

According to one embodiment herein, the background scheduling module selects the image depending on a size and a color frame of the spatial matrix incorporated in the background of the television program.

According to one embodiment herein, the background scheduling module accordingly schedules the selected image which replaces the spatial matrix, depending on a genre, a time period and the type of the television program.

According to one embodiment herein, the system comprises a library configured to store the image along with a scheduling data generated by the background scheduling module According to one embodiment herein, the chroma-keying unit is configured to check the background of the television program for presence of the spatial marker, wherein the chroma-keying unit is configured to replace the spatial marker with the selected image.

According to one embodiment herein, the broadcaster or the channel owner is provided with a choice of providing the spatial marker at any desired place on the telecast programme based on the time and the genre.

According to one embodiment herein, the head end module is a studio module.

According to one embodiment herein, the system and method enables to replace a spatial marker with a preset advertisement over a plurality of channels at one go based on the time and genre of the programme in the plurality of channels.

According to one embodiment herein, a library stored with a plurality of advertisements for replacing a spatial marker on a plurality of channels based on the genre and time of each individual channel. The spatial marker in individual channel is replaced with a respective or preset add based on the time and genre of the program being telecast tin the channel.

According to one embodiment herein, the scheduler or the scheduling unit is configured to identify a type of program and a spatial frame of predetermined size in the background area of the telecast program, to replace the spatial frame with a preset advertisement based on the genre and the type of the program and the telecast time.

According to one embodiment herein, the chroma keying unit is configured to check and identify the pre-set advertisement to be played in the area of spatial marker frame provided in the background of the telecast program in a channel. The chroma keying unit is further configured to check whether the preset advertisement to be played is received already from the scheduling unit.

According to one embodiment herein, the channel owner or the studio owner is provided with a choice of inserting a spatial frame of desired size at any desired place in the telecast program. The size of spatial frame is defined by the number of pixels in the spatial frame.

The system and method enables to replace a spatial marker with a preset advertisement over a plurality of channels based on the time and genre of the programme in the plurality of channels with a single stroke operation.

The system and method enables to identify a type of program and a spatial frame of predetermined size in the background area of the telecast program, to replace the spatial frame with a preset advertisement based on the genre and the type of the program and the telecast time with a single stroke of operation The system and method provides the channel owner or the studio owner or broadcaster with a choice of inserting a spatial frame of desired size at any desired place in the telecast program.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A system for providing integrated advertisements, the system comprising:
    a background scheduling module configured to schedule at least one image which is to be integrated into at least one television program to be broadcasted on a display terminal;
    a storage module configured to store the television program and the at least one image required to be integrated with the television program;
    a processor configured to superimpose at least one spatial marker identifiable by a corresponding unique key-color value, into at least a part of background of the television program, said processor further configured to divide the background of the television program into a plurality of frames, and identify the background color of each of the frames; and
    a chroma-keying unit having access to a plurality of key-color values, said chroma-keying unit configured to compare the background color of each of the frames with said key-color values, said chroma-keying unit further configured to identify the spatial marker by comparing a color of each of the frames with the key-color values, said chroma-keying unit further configured to superimpose the image into at least one frame identified as incorporating the spatial marker, only in the event that the color of the frame matches at least one of the key-color values corresponding to the spatial marker, said chroma-keying unit further configured to superimpose the image into at least one frame depending upon at least one of the background color of the frame and size of the spatial matrix.

2. The system according to claim 1, wherein the image is one of an advertisement, a scoreboard a trailer, a promotion banner and a logo.

3. The system according to claim 1, wherein the background scheduling module provides centralized scheduling of a plurality of images that are to be integrated with the television program at different time slots.

4. The system according to claim 1, wherein the background scheduling module is configured to identify a type of the television program which has to incorporate the image.

5. The system according to claim 1, wherein the background scheduling module selects at least one image to replace the spatial matrix, based on at least one of a genre, a time period and the type of the television program.

6. The system according to claim 1, comprises a library configured to store the image along with a scheduling data generated by the background scheduling module.

7. The system according to claim 1, wherein the chroma-keying unit is configured to replace the spatial matrix by the image over a plurality of television channels.

8. The system according to claim 1, wherein the processor divides the background of the television program into a plurality of frames of equal dimensions or different dimensions and wherein the plurality of frames are created based at least on the genre of television program.

9. The system according to claim 1, further comprises a communication module configured to transmit the television program integrated with the image to a set-top box, wherein the communicating module is configured to modulate and transmit the television program integrated with the image on a channel frequency.

10. The system according to claim 1, wherein a set-top box in communication with the communication module, is configured to tune to the channel frequency so as to receive the television program integrated with the image, the set top box further configured to display the television program on a display device.

11. A method for providing integrated advertisements, the method comprising the following steps:
scheduling at least one image to be integrated into at least one television program to be played on a display terminal;
storing the television program and the at least one image required to be integrated with the television program, superimposing at least one spatial marker identifiable by a corresponding unique key-color value, into at least a part of background of the television program;
dividing a background of the television program into a plurality of frames, and determining a color of each of the frames;
storing a plurality of key-color values in a chroma-keying unit;
comparing the background color of each of the frames with said key-color values and identifying the spatial marker by comparing the color of each of the frames with the key-color values;
superimposing the image into at least one frame identified as incorporating the spatial marker, only in the event that the color of the frame matches at least one of the key-color values corresponding to the spatial marker wherein the image is superimposed the frame depending upon at least one of the background color of the frame and size of the spatial matrix.

* * * * *